(12) United States Patent
Zeng et al.

(10) Patent No.: US 11,446,706 B2
(45) Date of Patent: Sep. 20, 2022

(54) TRASH SORTING AND RECYCLING METHOD, TRASH SORTING DEVICE, AND TRASH SORTING AND RECYCLING SYSTEM

(71) Applicant: BOE TECHNOLOGY GROUP CO., LTD., Beijing (CN)

(72) Inventors: Qi Zeng, Beijing (CN); Lijie Zhang, Beijing (CN); Lihua Geng, Beijing (CN); Han Yan, Beijing (CN); Xitong Ma, Beijing (CN); Tianyue Zhao, Beijing (CN)

(73) Assignee: Beijing BOE Technology Development Co., Ltd., Beijing (CN)

( * ) Notice: Subject to any disclaimer, the term of this patent is extended or adjusted under 35 U.S.C. 154(b) by 1079 days.

(21) Appl. No.: 16/076,451

(22) PCT Filed: Jan. 23, 2018

(86) PCT No.: PCT/CN2018/073809
§ 371 (c)(1),
(2) Date: Aug. 8, 2018

(87) PCT Pub. No.: WO2019/000929
PCT Pub. Date: Jan. 3, 2019

(65) Prior Publication Data
US 2021/0178432 A1    Jun. 17, 2021

(30) Foreign Application Priority Data
Jun. 30, 2017 (CN) .......................... 201710558594.1

(51) Int. Cl.
*B07C 5/342* (2006.01)
*G06N 3/08* (2006.01)
(Continued)

(52) U.S. Cl.
CPC ............ *B07C 5/3422* (2013.01); *B07C 5/361* (2013.01); *G06N 3/08* (2013.01); *G06Q 10/30* (2013.01); *B07C 2501/0054* (2013.01)

(58) Field of Classification Search
CPC ................. B07C 5/3422; B07C 5/361; B07C 2501/0054; G06N 3/08; G06Q 10/30
(Continued)

(56) References Cited

U.S. PATENT DOCUMENTS

| 7,975,853 B2 | 7/2011 | Furniss |
| 2016/0078414 A1 | 3/2016 | Rathore et al. |

(Continued)

FOREIGN PATENT DOCUMENTS

| CN | 102556547 A | 7/2012 |
| CN | 103552788 A | 2/2014 |

(Continued)

OTHER PUBLICATIONS

Chinese Office Action in Chinese Application No. 201710558594.1, dated May 8, 2019 with English translation.
(Continued)

*Primary Examiner* — Terrell H Matthews
(74) *Attorney, Agent, or Firm* — Collard & Roe, P.C.

(57) ABSTRACT

A trash sorting and recycling method, a trash sorting device and a trash sorting and recycling system are provided. The trash sorting and recycling method includes: acquiring a detection image of trash to be sorted; processing the detection image with a deep learning neural network to judge whether or not the trash to be sorted belongs to recyclable trash; if yes, sending a first control signal, to control to deliver the trash to be sorted into a recycling region; if no, sending a second control signal, to control to deliver the trash to be sorted into a non-recycling region.

16 Claims, 6 Drawing Sheets

(51) Int. Cl.
  *B07C 5/36* (2006.01)
  *G06Q 10/00* (2012.01)
(58) Field of Classification Search
  USPC .......................................................... 209/577
  See application file for complete search history.

(56) References Cited

U.S. PATENT DOCUMENTS

| | | | |
|---|---|---|---|
| 2018/0016096 A1* | 1/2018 | Krishnamurthy | B65F 1/1426 |
| 2019/0217342 A1* | 7/2019 | Parr | B07C 5/36 |
| 2019/0304236 A1* | 10/2019 | Chan | B29B 17/0026 |

FOREIGN PATENT DOCUMENTS

| | | | |
|---|---|---|---|
| CN | 104495139 A | | 4/2015 |
| CN | 204507883 U | | 7/2015 |
| CN | 205023252 U | | 2/2016 |
| CN | 105564864 A | | 5/2016 |
| CN | 105631482 A | | 6/2016 |
| CN | 105772407 A | * | 7/2016 |
| CN | 105772407 A | | 7/2016 |
| CN | 105787506 A | | 7/2016 |
| CN | 105836340 A | | 8/2016 |
| CN | 106874977 A | | 6/2017 |
| EP | 3 078 611 A1 | | 10/2016 |

OTHER PUBLICATIONS

International Search Report of PCT/CN2018/073809 in Chinese, dated Apr. 26, 2018, with English translation.
Notice of Transmittal of the International Search Report of PCT/CN2018/073809 in Chinese, dated Apr. 26, 2018.
Written Opinion of the International Searching Authority of PCT/CN2018/073809 in Chinese, dated Apr. 26, 2018 with English translation.

* cited by examiner

TRASH SORTING AND RECYCLING METHOD, TRASH SORTING DEVICE, AND TRASH SORTING AND RECYCLING SYSTEM

CROSS REFERENCE TO RELATED APPLICATIONS

This application is the National Stage of PCT/CN2018/073809 filed on Jan. 23, 2018, which claims priority under 35 U.S.C. § 119 of Chinese Application No. 201710558594.1 filed on Jun. 30, 2017, the disclosure of which is incorporated by reference.

TECHNICAL FIELD

Embodiments of the present disclosure relate to a trash sorting and recycling method, a trash sorting device and a trash sorting and recycling system.

BACKGROUND

With advancement of society, people's living standards and quality are gradually improved, and the amount of consumable things also increases day by day, so more and more trash is generated, and the trash is mainly disposed by methods such as landfill and incineration.

In order to effectively reduce the amount of trash disposal and slow down consumption of the earth's resources, recyclable trash among others may be sorted and recycled to be reused. At present, the method for sorting and recycling the recyclable trash mainly includes manual sorting, winnowing, etc., which renders high labor costs, slow processing speed and low efficiency.

SUMMARY

At least one embodiment of the present disclosure provides a trash sorting and recycling method, comprising: acquiring a detection image of trash to be sorted; processing the detection image with a deep learning neural network to judge whether or not the trash to be sorted belongs to recyclable trash; if yes, sending a first control signal, to control to deliver the trash to be sorted into a recycling region; if no, sending a second control signal, to control to deliver the trash to be sorted into a non-recycling region.

For example, in the trash sorting and recycling method provided by an embodiment of the present disclosure, the detection image includes a plurality of images photographed from different angles, the trash sorting and recycling method further comprises: processing the detection image with the deep learning neural network and combining processing results of the images photographed from different angles to judge whether or not the trash to be sorted belongs to the recyclable trash; if yes, sending the first control signal, to control to deliver the trash to be sorted into the recycling region; if no, sending the second control signal, to control to deliver the trash to be sorted into the non-recycling region.

For example, the trash sorting and recycling method provided by an embodiment of the present disclosure further comprises: acquiring an identification number of a trash sorting device corresponding to the acquired detection image; selecting a training parameter of the deep learning neural network corresponding to the identification number according to the identification number.

For example, the trash sorting and recycling method provided by an embodiment of the present disclosure further comprises: counting a recycling quantity, in a case where it is judged that the trash to be sorted belongs to the recyclable trash; sending a recycling control signal, in a case where the recycling quantity exceeds a predetermined bearing quantity of the recycling region, to prompt the recycling center to recycle the trash in the recycling region.

For example, in the trash sorting and recycling method provided by an embodiment of the present disclosure, the recyclable trash includes at least one type of recyclable trash, the recycling region includes at least one sub-recycling region, and the first control signal includes at least one sub-control signal, the trash sorting and recycling method further comprises: judging whether or not the trash to be sorted belongs to one of the at least one type of recyclable trash, and if yes, sending a corresponding sub-control signal, to control to deliver the trash to be sorted into a corresponding sub-recycling region; if no, sending a second control signal, to control to deliver the trash to be sorted into a non-recycling region.

For example, in the trash sorting and recycling method provided by an embodiment of the present disclosure, the judging whether or not the trash to be sorted belongs to the recyclable trash includes: calculating a matching ratio between the trash to be sorted and the recyclable trash; judging whether or not the matching ratio exceeds a first preset matching ratio threshold, and if yes, judging that the trash to be sorted belongs to the recyclable trash; if no, judging that the trash to be sorted does not belong to the recyclable trash.

For example, the trash sorting and recycling method provided by an embodiment of the present disclosure further comprises: in a case where the matching ratio is lower than the first preset matching ratio threshold, judging whether or not the matching ratio exceeds a second preset matching ratio threshold, and if yes, storing the detection image; if no, deleting the detection image, wherein, the second preset matching ratio threshold is smaller than the first preset matching ratio threshold.

For example, the trash sorting and recycling method provided by an embodiment of the present disclosure further comprises: re-judging whether or not the trash to be sorted shown in the stored detection image belongs to the recyclable trash; if yes, adding the stored detection image to a sample image library of the deep learning neural network; if no, deleting the stored detection image.

For example, the trash sorting and recycling method provided by an embodiment of the present disclosure further comprises: re-training the deep learning neural network with a training image in the sample image library, after adding the stored detection image to the sample image library, and modifying a training parameter of the deep learning neural network according to a training result.

For example, in the trash sorting and recycling method provided by an embodiment of the present disclosure, the deep learning neural network is a convolutional neural network.

At least one embodiment of the present disclosure provides a trash sorting device, comprising: a sorting structure, an image acquisition device and a terminal controller, wherein, the image acquisition device is configured to acquire a detection image of trash to be sorted; the terminal controller is configured to transmit the detection image, and is further configured to receive a control signal and control the sorting structure according to the control signal.

For example, in the trash sorting device provided by an embodiment of the present disclosure, the sorting structure includes a motor and a baffle, the terminal controller is configured to control a rotation direction of the motor according to the control signal, to drive the baffle to rotate in at least two directions.

For example, the trash sorting device provided by an embodiment of the present disclosure further comprises: a box body, wherein, the box body includes a recycling region and a non-recycling region, the sorting structure is configured to deliver the trash to be sorted into the recycling region or the non-recycling region under control of the control signal.

At least one embodiment of the present disclosure provides a trash sorting and recycling system, comprising: a control device and any of the trash sorting device described above, wherein, the control device includes: a processor and a memory, the memory has a computer program suitable for running by the processor stored therein, and the computer program is run by the processor to execute steps of: acquiring a detection image; processing the detection image with a deep learning neural network to judge whether or not trash to be sorted belongs to recyclable trash; if yes, sending a first control signal to the trash sorting device, to control to deliver the trash to be sorted into a recycling region; if no, sending a second control signal to the trash sorting device, to control to deliver the trash to be sorted into a non-recycling region.

For example, in the trash sorting and recycling system provided by an embodiment of the present disclosure, the detection image includes a plurality of images photographed from different angles, when the computer program is run by the processor, the system further executes steps of: processing the detection image with the deep learning neural network and combining process results of the images photographed from different angles, to judge whether or not the trash to be sorted belongs to the recyclable trash; if yes, sending the first control signal; if no, sending the second control signal.

For example, in the trash sorting and recycling system provided by an embodiment of the present disclosure, when the computer program is run by the processor, the system further executes steps of: acquiring an identification number of the trash sorting device corresponding to the acquired detection image; selecting a training parameter of the deep learning neural network corresponding to the identification number according to the identification number.

For example, in the trash sorting and recycling system provided by an embodiment of the present disclosure, when the computer program is run by the processor, the system further executes steps of: counting a recycling quantity, in a case where it is judged that the trash to be sorted belongs to the recyclable trash; sending a recycling control signal, in a case where the recycling quantity exceeds a predetermined bearing quantity of the recycling region, to prompt the recycling center to recycle the trash in the recycling region.

For example, in the trash sorting and recycling system provided by an embodiment of the present disclosure, when the computer program is run by the processor, the system further executes steps of: calculating a matching ratio between the trash to be sorted and the recyclable trash; judging whether or not the matching ratio exceeds a first preset matching ratio threshold, and if yes, judging that the trash to be sorted belongs to the recyclable trash; if no, judging that the trash to be sorted does not belong to the recyclable trash.

For example, in the trash sorting and recycling system provided by an embodiment of the present disclosure, when the computer program is run by the processor, the system further executes steps of: judging whether or not the matching ratio exceeds a second preset matching ratio threshold, in a case where the matching ratio is lower than the first preset matching ratio threshold; if yes, storing the detection image; if no, deleting the detection image, wherein, the second preset matching ratio threshold is smaller than the first preset matching ratio threshold.

For example, in the trash sorting and recycling system provided by an embodiment of the present disclosure, when the computer program is run by the processor, the system further executes steps of: re-judging whether or not the trash to be sorted shown in the stored detection image belongs to the recyclable trash; if yes, adding the stored detection image to a sample image library of the deep learning neural network; if no, deleting the stored detection image.

For example, in the trash sorting and recycling system provided by an embodiment of the present disclosure, when the computer program is run by the processor, the system further executes steps of: re-training the deep learning neural network with a training image in the sample image library, after adding the stored detection image to the sample image library, and modifying a training parameter of the deep learning neural network according to a training result.

For example, in the trash sorting and recycling system provided by an embodiment of the present disclosure, the control device is a remote control device for the trash sorting device, and the trash sorting device and the control device communicate with each other through a wired network or a wireless network.

BRIEF DESCRIPTION OF THE DRAWINGS

In order to clearly illustrate the technical solution of the embodiments of the present disclosure, the drawings of the embodiments will be briefly described in the following; it is obvious that the described drawings are only related to some embodiments of the present disclosure and thus are not limitative of the present disclosure.

DETAILED DESCRIPTION

Figure 1A:
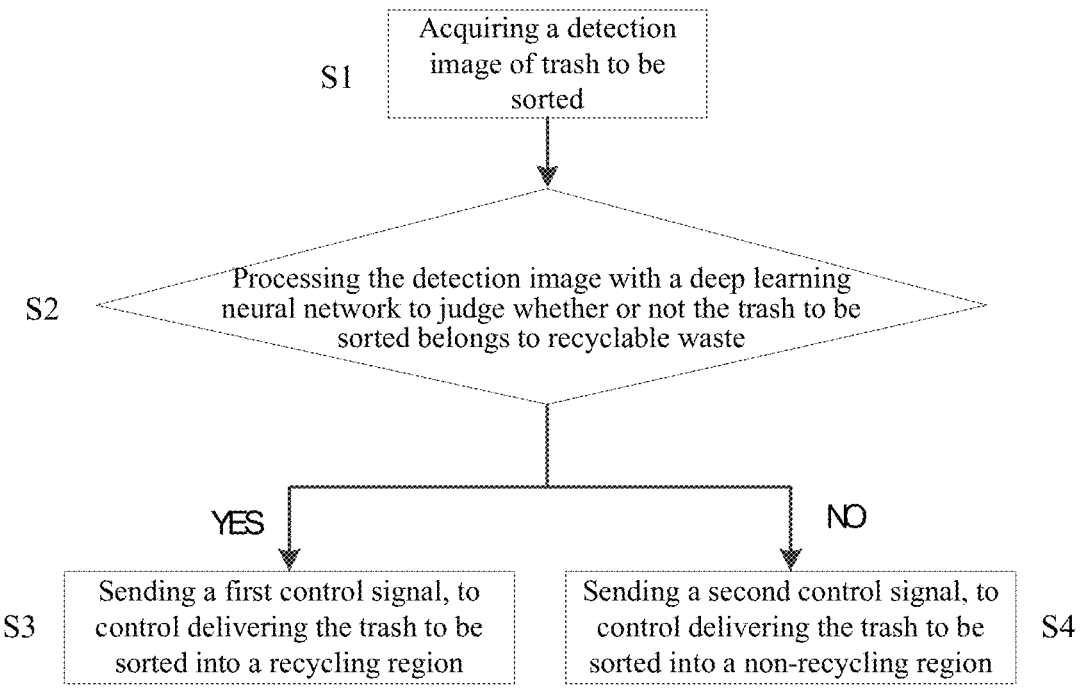
FIG. 1A is a schematic flow chart of one example of a trash sorting and recycling method provided by an embodiment of the present disclosure.

In order to make objects, technical details and advantages of the embodiments of the present disclosure apparent, the technical solutions of the embodiment will be described in a clearly and fully understandable way in connection with the drawings related to the embodiments of the present disclosure. It is obvious that the described embodiments are just a part but not all of the embodiments of the present disclosure. Based on the described embodiments herein, those skilled in the art can obtain other embodiment(s), without any inventive work, which should be within the scope of the present disclosure.

Unless otherwise specified, the technical terms or scientific terms used in the present disclosure should be of general meaning as understood by those ordinarily skilled in the art. In the present disclosure, words such as "first", "second" and the like do not denote any order, quantity, or importance, but rather are used for distinguishing different components. Words such as "include" or "comprise" and the like denote that elements or objects appearing before the words of "include" or "comprise" cover the elements or the objects enumerated after the words of "include" or "comprise" or equivalents thereof, not exclusive of other elements or objects. Words such as "connected" or "connecting" and the like are not limited to physical or mechanical connections, but may include electrical connection, either direct or indirect. Words such as "up", "down", "left", "right" and the like are only used for expressing relative positional relationship, when the absolute position of the described object is changed, the relative positional relationship may also be correspondingly changed. In order to keep the following description of the embodiments of the present disclosure clear and concise, detailed description of known functions and known components are omitted in the present disclosure.

In life, people produce a large amount of household trash every day. In order to recycle and reuse resources, recyclable trash among others may be sorted and recycled. Usually, all the trash needs to be transported to a trash station, and the trash is manually sorted and recycled by a worker in a trash recycling center, so trash sorting and recycling is low in efficiency, and high in cost.

Trash bins are widely used in various regions such as beaches, stations, libraries and schools; in different regions, trash bins receive different trash, so that it is necessary to sort and recycle different types of recyclable trash according to different regions. For example, in regions such as libraries and schools, it is necessary to recycle recyclable trash such as trash paper; in regions such as beaches and stations, it is necessary to recycle recyclable trash such as plastic bottles. In order to reduce sorting and recycling work of the worker in the trash recycling center, the recyclable trash may be automatically sorted at the trash bin, to improve trash sorting and recycling efficiency.

At least one embodiment of the present disclosure provides a trash sorting and recycling method, comprising: acquiring a detection image of trash to be sorted; processing the detection image with a deep learning neural network to judge whether or not the trash to be sorted belongs to recyclable trash, if yes, sending a first control signal, to control to deliver the trash to be sorted into a recycling region; if no, sending a second control signal, to control to deliver the trash to be sorted into a non-recycling region. In the trash sorting and recycling method, the trash to be sorted is detected and recognized, and automatically sorted and recycled by using a method of the deep learning neural network, so as to improve recognition accuracy of the trash to be sorted, reduce sorting and recycling work of a worker in a trash recycling and processing center, improve trash sorting and recycling efficiency, and reduce costs of trash sorting and recycling.

Hereinafter, several embodiments of the present disclosure will be described in detail, but the present disclosure is not limited to these specific embodiments.

Figure 1B:
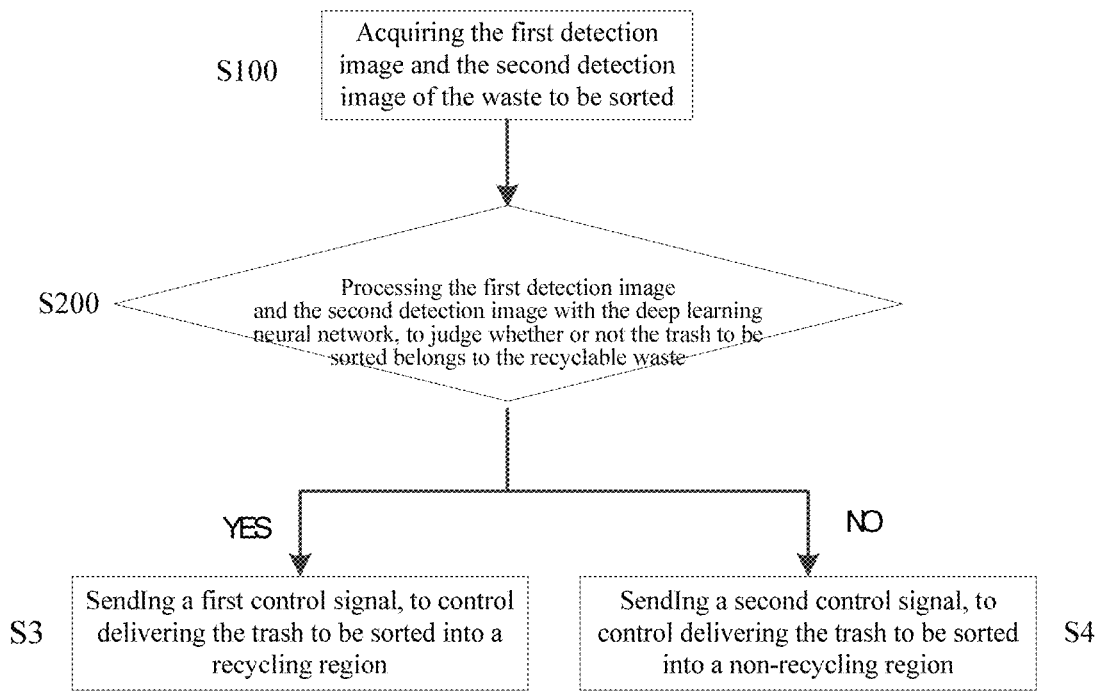
FIG. 1B is a schematic flow chart of another example of the trash sorting and recycling method provided by the embodiment of the present disclosure.

An embodiment of the present disclosure provides a trash sorting and recycling method. FIG. 1A shows a schematic flow chart of one example of the trash sorting and recycling method provided by the embodiment of the present disclosure, and FIG. 1B shows a schematic flow chart of another example of the trash sorting and recycling method provided by the embodiment of the present disclosure.

For example, as shown in FIG. 1A, in one example, the trash sorting and recycling method provided by the embodiment of the present disclosure may comprise operations below:

S1: acquiring a detection image of trash to be sorted;

S2: processing the detection image with a deep learning neural network to judge whether or not the trash to be sorted belongs to recyclable trash;

If yes, executing operation S3: sending a first control signal, to control to deliver the trash to be sorted into a recycling region;

If no, executing operation S4: sending a second control signal, to control to deliver the trash to be sorted into a non-recycling region.

In the trash sorting and recycling method provided by the embodiment of the present disclosure, the trash to be sorted is detected and recognized, and automatically sorted and recycled by using a method of the deep learning neural network, so as to improve recognition accuracy of the trash to be sorted, reduce sorting and recycling work of a worker in a trash recycling and processing center, improve trash sorting and recycling efficiency, and reduce costs of trash sorting and recycling.

For example, the trash sorting and recycling method may be executed on a server end (or a cloud end). For example, the server end (or the cloud end) may send an image acquisition signal, and transmit the image acquisition signal to a trash sorting device, and the trash sorting device acquires the detection image of the trash to be sorted according to the received image acquisition signal, and transmits the detection image to the server end (or the cloud end). Alternatively, the trash sorting device can also periodically transmit the detection image of the trash to be sorted to the server end (or the cloud end). Then, the server end (or the cloud end) processes the received detection image with the deep learning neural network to judge whether or not the trash to be sorted shown in the detection image belongs to the recyclable trash, and according to a processing result, the server end (or the cloud end) sends a control signal, and transmits the control signal to the trash sorting device, to control the trash sorting device to deliver the trash to be sorted into a designated region. It should be noted that, the server end (or the cloud end) may automatically send the control signal; or, a backstage user may also manually control the server end (or the cloud end) to send the control signal.

In the trash sorting and recycling method provided by the embodiment of the present disclosure, it is only necessary to acquire the detection image of the trash to be sorted at the trash sorting device, and transmit the acquired detection image to the server end (or the cloud end), and the server end (or the cloud end) recognizes and detects the image, so there is no need to set special hardware and complex software at the trash sorting device, which is easy to maintain and popularize the trash sorting device.

It should be noted that, the trash sorting and recycling method provided by the embodiment of the present disclosure may also be executed on a trash sorting device end, that is, after the trash sorting device acquires the detection image, it processes the acquired detection image with the deep learning neural network to judge whether or not the trash to be sorted belongs to the recyclable trash.

Hereinafter, the embodiment of the present disclosure will be described with a case where the trash sorting and recycling method is executed on the server end (or the cloud end) as an example. It should be understood by those skilled in the art that, the trash sorting and recycling method provided by the present disclosure may also be executed only on the trash sorting device end, which will not be limited by the embodiment of the present disclosure.

For example, the detection image can include a plurality of images photographed from different angles. As shown in FIG. 1B, in one example, the detection image can include a first detection image and a second detection image. The trash sorting and recycling method shown in FIG. 1B is similar to the trash sorting and recycling method shown in FIG. 1A, and the difference rests with:

S100: acquiring the first detection image and the second detection image of the trash to be sorted;

S200: processing the first detection image and the second detection image with the deep learning neural network, to judge whether or not the trash to be sorted belongs to the recyclable trash.

It should be noted that, in the example shown in FIG. 1B, steps after operation S200 are the same as steps after operation S2 in FIG. 1A, that is, executing operations S3 and S4. That is to say, in the example shown in FIG. 1B, in operation S200, the first detection image and the second detection image may be respectively processed with the deep learning neural network, and a processing result of the first detection image and a processing result of the second detection image are combined, to judge whether or not the trash to be sorted belongs to the recyclable trash. If yes, operation S3 is executed; and if no, operation S4 is executed.

For example, in step S200, it may be respectively judged whether or not the trash to be sorted shown in the first detection image and the trash to be sorted shown in the second detection image belong to the recyclable trash; or, it may be judged whether or not it belongs to the recyclable trash in combination with feature information of the trash to be sorted which is extracted from the first detection image and the second detection image.

For example, photographing angles of the first detection image and the second detection image are different. As compared with detection and recognition performed with a single detection image, detection and recognition performed on the trash to be sorted with a plurality of detection images at different photographing angles, may extract more feature information of the trash to be sorted, so as to improve recognition accuracy and reduce a misjudgment ratio.

It should be noted that, the operation of acquiring the first detection image and the operation of acquiring the second detection image may be executed in parallel, or may also be executed in series in a time-sharing manner.

For example, the deep learning neural network may include a neural network such as a convolutional neural network (CNN), a stack self-coding network, a sparse coding network, a cyclic neural network, a deep belief network; and the deep learning neural network may perform training on a training image of the recyclable trash with one or a combination of several of the above-described neural networks.

Figure 2:
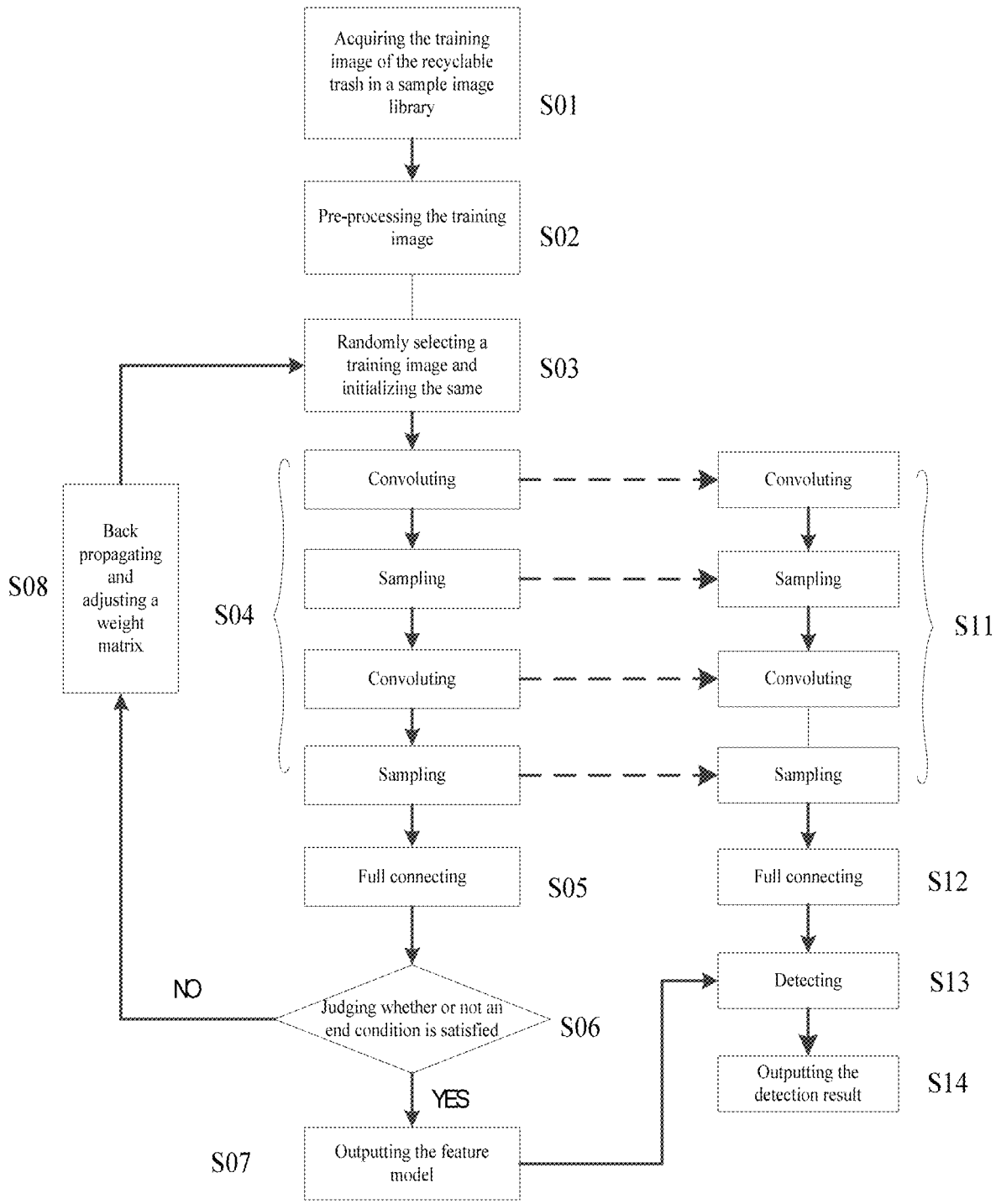
FIG. 2 is a schematic flow chart of a training process and a detection process of a deep learning neural network provided by the embodiment of the present disclosure.

FIG. 2 is a schematic flow chart of a training process and a detection process of the deep learning neural network provided by the embodiment of the present disclosure. For example, as shown in FIG. 2, the training process includes operations below.

S01: acquiring the training image of the recyclable trash in a sample image library. The training image may include images of the recyclable trash at different photographing angles.

S02: pre-processing the training image. The pre-processing may eliminate irrelevant information in the training image, facilitate extraction of the feature information of the recyclable trash as shown in the training image, and improve reliability of feature extraction.

After the training image is pre-processed, operation S03 is executed: randomly selecting a training image and initializing the same. By initializing the training image, the training image can be transformed into a data signal that the deep learning neural network can process, to facilitate subsequent operations.

After the training image is initialized, operation S04 is executed: convoluting and sampling. For example, the training image may be subjected to several times of convoluting and sampling, a feature of the training image can be extracted by convoluting, and a scale of the training data may be reduced by sampling, to reduce a calculation amount.

For example, during a convoluting process, a plurality of convoluting kernels is applied to the training image, to acquire a plurality of feature mappings, so as to acquire different features of the recyclable trash. Each feature mapping, for example, extracts one feature of the recyclable trash.

For example, the sampling process can process the training image by a method such as average combining, maximum combining, and random combining. For example, during the sampling process, each set of pixels (e.g., four pixels, etc.) in the feature mapping acquired after convoluting may be summed, multiplied by a weight value, and added with an offset, to obtain a result, which is subjected to a sigmoid function, then a new feature mapping may be obtained. The weight value and the offset control linearity of the sigmoid function; if the weight value is relatively small, an operation of the sigmoid function approximates to a linear operation, and the sampling process is equivalent to blurring image; if the weight value is relatively large, according to a magnitude of the offset, the sampling process may be equivalent to a "OR" operation with noisy or a "AND" operation with noisy.

After the convoluting and sampling are performed on the training image, operation S05 is executed: full connection. In operation S04, a last sampling layer or convolutional layer is connected with one or more fully connected layers. The fully connected layer is configured to synthesize the feature of the recyclable trash extracted after the convoluting and sampling and output a training parameter and a feature model of the recyclable trash. The feature model is an abstract feature expression of the recyclable trash.

S06: judging whether or not an end condition is satisfied. The feature model output by the fully connected layer(s) is judged; when the feature model satisfies the end condition, that is, the feature model matches a preset standard feature model, operation S07 is executed: outputting the feature model. When the feature model does not satisfy the end condition, that is, the feature model does not match the preset standard feature model, operation S08 is executed: back propagating and adjusting a weight matrix. During the training process, if there is an error between the output feature model and the standard feature model, error information is back-propagated along an original path by back propagation, so as to modify training parameters of respective layers (for example, the convolutional layer and the sampling layer); the training parameter may include, for example, a weight value and an offset, and then the training image is subjected to convoluting and sampling again with the convolutional layer and the sampling layer modified, until the feature model satisfies the end condition.

It should be noted that, although only two times of convoluting operation and two times of sampling operation are shown in FIG. 2, it is not limited thereto, and the training image may be subjected to many times of convoluting and many times of sampling.

For example, in operation S2 and operation S200, the processing the first detection image and/or the second detection image with the deep learning neural network may include operations below:

After acquiring the first detection image and/or the second detection image of the trash to be sorted, operation S11 is executed: convoluting and sampling. For example, the first detection image and/or the second detection image may be subjected to convoluting and sampling with a convolution training parameter and a sampling training parameter acquired by using the above-described training process, so as to obtain the feature of the trash to be sorted shown in the first detection image and/or the second detection image.

After many times of convoluting and many times of sampling are performed on the training image, operation S12 is executed: full connection. The fully connected layer is configured to be able to synthesize various features of the trash to be sorted and output the feature model of the trash to be sorted.

S13: detecting. For example, the feature model of the trash to be sorted is compared with the feature model of the recyclable trash obtained by training, to judge whether or not the trash to be sorted belongs to the recyclable trash.

S14: outputting the detection result.

Then, operation S3 or S4 is executed according to the detection result output. For example, deep learning training may be performed on different types of recyclable trash with a large number of training images in advance, so as to obtain training parameters and feature models of different types of recyclable trash. For example, each sample image library includes training images of a same type of recyclable trash, and the training images may include images of the recyclable trash at different angles and in different forms, to acquire the feature of the recyclable trash more comprehensively. For example, the training image may include a base view such as a front view, a rear view, a bottom view, a top view, a left view and a right view of the recyclable trash.

For example, the sample image library, the training model parameters, etc. of the deep learning neural network may be deployed in a form of a database on a backstage server end, or, may also be deployed on a server end of a local area network or a wide area network (for example, the cloud end) to be read by, for example, the backstage server end. The backstage server end may be provided in a monitoring room and other places for remote monitoring.

For example, the first detection image and/or the second detection image may include one image of the trash to be sorted, or may include a plurality of images of the trash to be sorted.

For example, the number of the first detection image and/or the second detection image may be preset, or may also be randomly generated by a controller or the server end (or the cloud end) at the trash sorting device when performing trash sorting and recycling. For example, it may be preset that the first detection image includes only one image of the trash to be sorted, and the second detection image also includes only one image of the trash to be sorted.

For example, the detection image may be a grayscale image, or may also be a color image. For another example, the detection image may be a photograph, and may also be a one-frame, a multi-frame or a multi-frame synthesized image in a video.

For example, the detection image may be pre-processed, to facilitate extracting the feature information of the trash to be sorted shown in the detection image, so as to improve reliability of feature extraction. For example, in a case where the detection image is a photograph, the pre-processing may include a process such as zooming out the photograph, gamma correction, image enhancement, or noise reduction filtering; and in a case where the detection image is acquired from the video, the pre-processing may include extracting a key frame of the video, etc. The pre-processing may be performed before processing the detection image with the deep learning neural network, that is, before executing operation S11.

For example, the pre-processing may be performed at the trash sorting device, or may also be performed at the server end (or the cloud end).

For example, a first original image and/or a second original image when no object is placed in an image acquisition region in the trash sorting device may be pre-stored. For example, a photographing angle of the first original image is the same as that of the first detection image, and a photographing angle of the second original image is the same as that of the second detection image. During trash sorting and recycling, the image acquisition region is monitored in real time with an image acquisition device (for example, a camera), and the detection image is acquired from a video acquired by the image acquisition device periodically (for example, at every 10 seconds, 30 seconds, or 1 minute), to acquire a first image and/or a second image, a photographing angle of the first image is the same as that of the first detection image, a photographing angle of the second image is the same as that of the second detection image; and then the first image is compared with the first original image, and/or, the second image is compared with the second original image; when a similarity ratio of the first image to the first original image is lower than a predetermined first similarity threshold, and/or a similarity ratio of the second image to the first original image is lower than a predetermined second similarity threshold, it is judged that trash to be sorted presents in the image acquisition region, the first image is taken as the first detection image, and the second image is taken as the second detection image. Then, the first detection image and/or the second detection image acquired is transmitted to the server end (or the cloud end), the server end (or the cloud end) processes the first detection image and/or the second detection image, and sends the control signal to the trash sorting device according to the processing result, to control the trash sorting device to deliver the trash to be sorted into the designated region.

For example, the first similarity threshold and/or the second similarity threshold may be preset, and the first similarity threshold and the second similarity threshold may be the same or different. For example, the first similarity threshold and the second similarity threshold may both be 95%, which will not be limited.

It should be noted that, after the first detection image and/or the second detection image is transmitted to the server end (or the cloud end), the image acquisition device may stop acquiring the detection image of the trash to be sorted, and when the trash sorting device receives the control signal transmitted by the server end (or the cloud end), and delivers the trash to be sorted into the designated region, the image acquisition device resumes timed acquiring detection image in the video. Therefore, it is possible to prevent the first detection image and/or the second detection image of the same trash to be sorted from being repeatedly acquired, to reduce processing time and improve work efficiency.

For example, the trash sorting device may be provided with a timer or a timing program, and the timer or the timing program may periodically trigger the image acquisition device to acquire the detection image of the trash to be sorted. After the detection image is transmitted to the server end (or the cloud end), the timer or the timing program stops working, so that the image acquisition device stops acquiring the detection image of the trash to be sorted, and when the trash sorting device receives the control signal transmitted by the server end (or the cloud end), and delivers the trash to be sorted into the designated region, the timer or the timing program performs a clear operation and re-times.

For another example, the trash sorting device may also be provided with a sensor according to needs. The sensor is configured to sense whether or not trash to be sorted presents in the image acquisition region, and if yes, the image acquisition device acquires the detection image of the trash to be sorted, and then performs subsequent operations on the detection image; if no, the image acquisition device does not perform any operation to save power.

For example, in one example, the trash sorting and recycling method further comprises: acquiring an identification number of the trash sorting device corresponding to the acquired detection image; and selecting a training parameter of the deep learning neural network corresponding to the identification number according to the identification number.

For example, the training parameter may include a convolution training parameter, a sampling training parameter, etc., and may also include a parameter such as a feature model.

For example, identification numbers of trash sorting devices in different regions may be preset. Based on the identification number of each trash sorting device, the training parameter of the deep learning neural network corresponding to the identification number is selected, so as to detect and recycle different types of recyclable trash according to different regions. For example, trash sorting devices provided in teaching buildings, libraries, etc. in schools may be used for recycling recyclable trash such as trash paper; trash sorting devices provided in beaches, stations, basketball courts, etc. may be used for recycling recyclable trash such as plastic bottles.

For example, each trash sorting device may recycle one type of recyclable trash, or may also recycle a plurality of different types of recyclable trash. For example, the identification numbers of the trash sorting devices may correspond to a plurality of different training parameters of the deep learning neural network, to implement recycling a plurality of different types of recyclable trash.

For example, in one example, the recyclable trash includes at least one type of recyclable trash, correspondingly, a recycling region of each trash sorting device includes at least one sub-recycling region, and the first control signal includes at least one sub-control signal. For example, the recyclable trash may include plastic products (e.g., including plastic bottles, etc.), paper products (e.g., including A4 paper, books, etc.), metal products (e.g., including cans, etc.), and glass products, and the like. Correspondingly, the recycling region may include a plastic product sub-recycling region, a paper product sub-recycling region, a metal product sub-recycling region, and a glass product sub-recycling region; and the first control signal may also include a plastic product sub-control signal, a paper product sub-control signal, a metal product sub-control signal and a glass product sub-control signal.

In this case, the trash sorting and recycling method may further comprise operations below: judging whether or not the trash to be sorted belongs to one of the at least one type of recyclable trash, and if yes, sending a corresponding sub-control signal, to control to deliver the trash to be sorted into a corresponding sub-recycling region; if no, sending a second control signal, to control to deliver the trash to be sorted into a non-recycling region.

For example, the recyclable trash includes a plurality of types of recyclable trash, and judging whether or not the trash to be sorted belongs to one of the plurality of types of recyclable trash may include: firstly, acquiring a plurality of different training parameters corresponding to the identification numbers; then, separately processing the first detection image and/or the second detection image with each one of the plurality of different training parameters, so as to obtain a processing result of the plurality of first detection images and/or a processing result of the plurality of second detection images; finally, combining the processing result of the plurality of first detection images and/or the processing result of the plurality of second detection images to judge whether or not the trash to be sorted belongs to one of the plurality of types of recyclable trash. It should be noted that, the number of the plurality of different training parameters corresponding to the identification numbers may be equal to the number of the plurality of types of recyclable trash.

For example, the identification number of the trash sorting device may be in various forms and may include different types of information. For example, the identification number may be an identification code (for example, a character string), and the identification code may be used for acquiring one or more kinds of information such as a training parameter, a feature model, and a type of recyclable trash from a corresponding database; for another example, the identification information may be a composite code, for example, including both the identification code and geographic location (longitude, latitude) information of the trash sorting device.

For example, the identification numbers may be stored in one database in a centralized manner, and deployed on one or more servers for querying, which will not be limited in the embodiment of the present disclosure.

For example, in one example, the trash sorting and recycling method further comprises operations below: counting a recycling quantity, in a case where it is judged that the trash to be sorted belongs to the recyclable trash; and sending a recycling control signal, in a case where the recycling quantity exceeds a predetermined bearing quantity of the recycling region, to prompt the recycling center to recycle the trash in the recycling region.

For example, the predetermined bearing quantity may be preset according to a size of the recycling region and a type of the recyclable trash.

For example, the trash sorting device may be provided with a counter or a counting program. When the trash sorting device receives the first control signal and delivers the trash to be recycled into the recycling region, that is, in a case where it is judged that the trash to be sorted belongs to the recyclable trash, the counter or the counting program counts a recycled quantity, and in a case where the recycled quantity counted by the counter or the counting program exceeds the predetermined bearing quantity of the recycling region, the server end (or the cloud end) sends a recycling control signal, to prompt the recycling center to recycle the trash in the recycling region. It should be noted that, when the trash sorting device receives the second control signal and delivers the trash to be recycled into the non-recycling region, that is, in a case that it is judged that the trash to be sorted does not belong to the recyclable trash, the counter or the counting program may count a trash quantity of the non-recycling region, and in a case where the trash quantity of the non-recycling region exceeds the predetermined bearing quantity of the non-recycling region, the server end (or the cloud end) may send a trash taking-away control signal, to prompt the recycling center or the trash disposal center to take away the trash of the non-recycling region.

For example, the server end (or the cloud end) may perform the clear operation on the counter after sending the recycling control signal. Alternatively, after a worker at the recycling center recycles the trash from the recycling region, the worker of the recycling center sends an recycling ending signal to the trash sorting device through the server end (or the cloud end), to control the counter to perform the zeroing operation.

It should be noted that, the counter or the counting program may also be provided on the server end (or the cloud end), which will not be limited in the present disclosure.

For example, the recycling control signal may include information such as the type of recyclable trash, location of the trash sorting device, and the like.

For example, in one example, the judging whether or not the trash to be sorted belongs to the recyclable trash includes operations below: calculating a matching ratio between the trash to be sorted and the recyclable trash; judging whether or not the matching ratio exceeds a first preset matching ratio threshold, and if yes, judging that the trash to be sorted belongs to the recyclable trash; if no, judging that the trash to be sorted does not belong to the recyclable trash.

For example, in a case where it is judged that the trash to be sorted belongs to the recyclable trash, the detection image may also be stored as a sample for subsequent deep learning training. For example, the detection image is stored while the first control signal is being sent.

For example, the matching ratio may be a detection result output by the deep learning neural network.

For example, the first preset matching ratio threshold may be 90%, that is, when the matching ratio of the trash to be sorted to the recyclable trash exceeds 90%, it may be judged that the trash to be sorted belongs to the recyclable trash.

For example, in one example, the trash sorting and recycling method further comprises operations below: in a case where the matching ratio is lower than the first preset matching ratio threshold, judging whether or not the matching ratio exceeds the second preset matching ratio threshold, and if yes, storing the detection image; if no, deleting the detection image.

For example, the second preset matching ratio threshold is smaller than the first preset matching ratio threshold. The second preset matching ratio threshold may be 80%, that is, when the matching ratio of the trash to be sorted to the recyclable trash exceeds 80% but is lower than 90%, the detection image may be stored, as a sample for subsequent deep learning training.

It should be noted that, the first preset matching ratio threshold and the second preset matching ratio threshold may also be other values, as long as it is ensured that the second preset matching ratio threshold is smaller than the first preset matching ratio threshold.

For example, in one example, the trash sorting and recycling method further comprises operations below: re-judging whether or not the trash to be sorted shown in the stored detection image belongs to the recyclable trash, and if yes, adding the stored detection image to the sample image library of the deep learning neural network; if no, deleting the stored detection image.

For example, re-judging whether or not the trash to be sorted shown in the stored detection image belongs to the recyclable trash may prevent misjudgment and increase the training sample of deep learning, so as to dynamically adjust the training parameter of the deep learning neural network in real time.

For example, the method of re-judging whether or not the trash to be sorted belongs to the recyclable trash may be different from the method of the previous judgment. For example, one or a combination of several of a statistical method (i.e., a decision theory approach), a syntax recognition method, a neural network method, a template matching method, or a geometric transformation method may be used for re-detecting and recognizing the detection image, to judge whether or not the trash to be sorted shown in the stored detection image belongs to recyclable trash. For another example, whether or not the trash to be sorted shown in the stored detection image belongs to the recyclable trash may be manually checked by the backstage user periodically, and adding the stored detection image to the sample image library or deleting the stored detection image are controlled according to an input instruction of the user.

For example, in one example, the trash sorting and recycling method further comprises operations below: re-training the deep learning neural network with the training image in the sample image library, after adding the detection image to the sample image library, and modifying the training parameter of the deep learning neural network according to the training result. The trash sorting and recycling method provided by the example may timely expand the sample image library, cyclically train the sample image in the sample image library, and modify the training parameter, so as to further improve the recognition accuracy and reduce a misjudgment ratio.

Figure 3A:
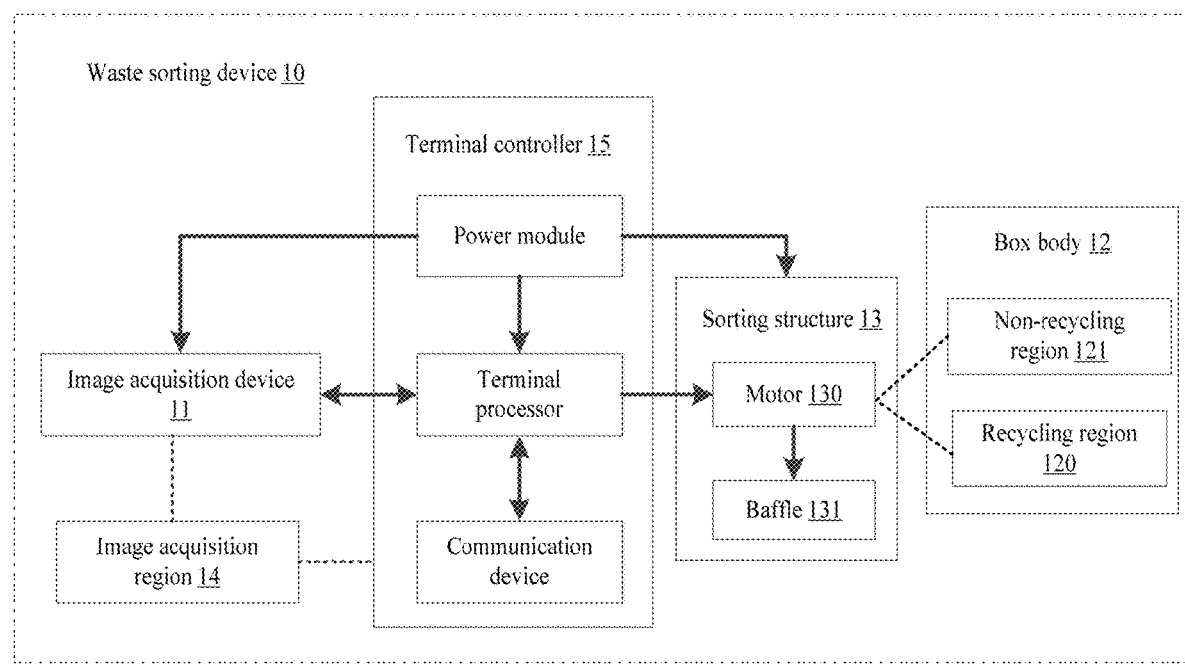
FIG. 3A is a schematic block diagram of a trash sorting device provided by an embodiment of the present disclosure.

An embodiment of the present disclosure further provides a trash sorting device. FIG. 3A shows a schematic block diagram of the trash sorting device provided by the embodiment of the present disclosure, and FIG. 3B shows a structural schematic diagram of the trash sorting device provided by the embodiment of the present disclosure.

Figure 3B:
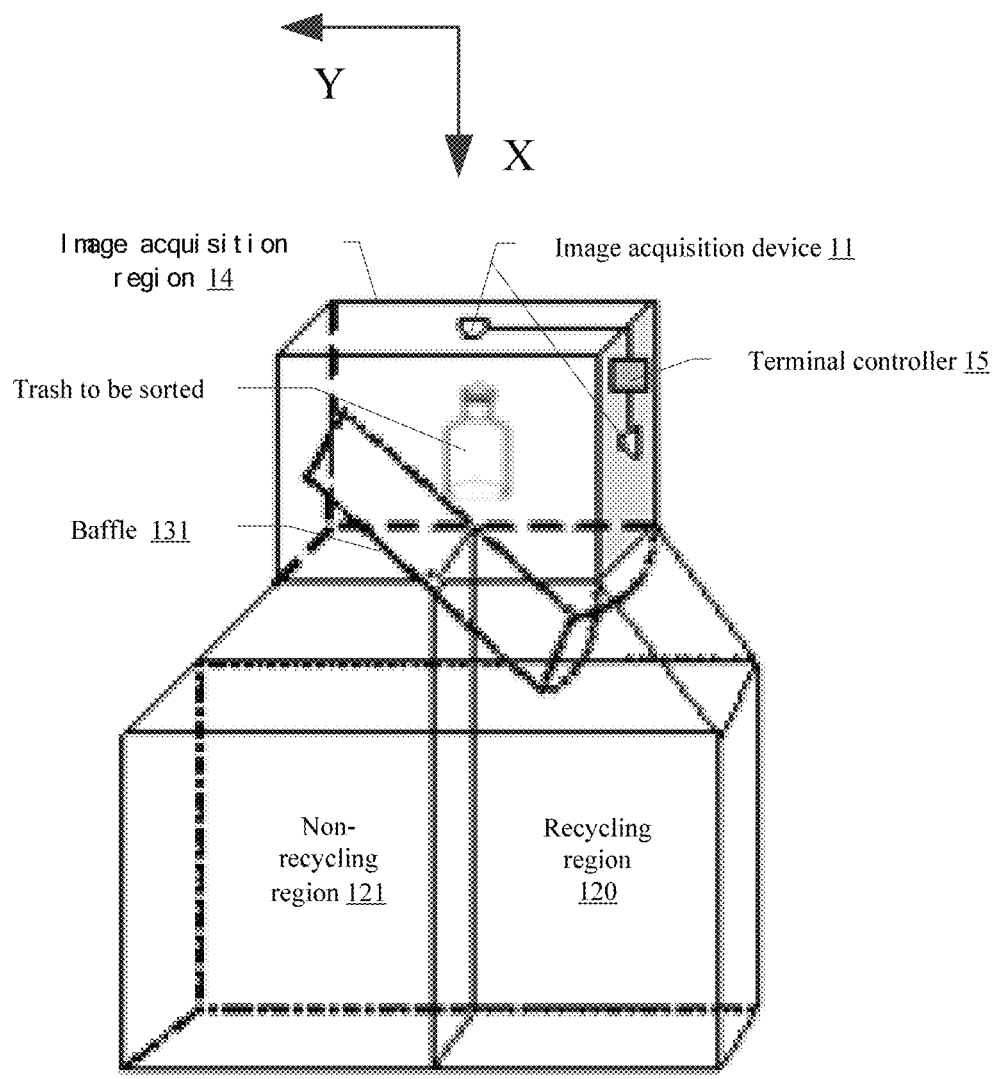
FIG. 3B is a structural schematic diagram of a trash sorting device provided by the embodiment of the present disclosure.

For example, as shown in FIG. 3A and FIG. 3B, a trash sorting device 10 may comprise an image acquisition device 11, a box body 12, a sorting structure 13, an image acquisition region 14, and a terminal controller 15.

For example, the image acquisition device 11 may include one or more cameras. The terminal controller 15 may be implemented by hardware, software, firmware, and any feasible combination thereof.

For example, the image acquisition region 14 is configured such that the trash to be sorted placed therein, and the image acquisition device 11 is configured to acquire a detection image of the trash to be sorted. For example, the detection image may include a plurality of images photographed from different angles. In one example, the detection image may include a first detection image and a second detection image, and photographing angles of the first detection image and the second detection image are different. As shown in FIG. 3B, the trash sorting device 10 may comprise two image acquisition devices 11 which are provided at the top and at the lateral side of the image acquisition region 14 respectively. The image acquisition device 11 located at the top may acquire the first detection image, that is, the first detection image is an image photographed from an X direction; the image acquisition device 11 located at the lateral side may acquire the second detection image, that is, the second detection image is an image photographed from a Y direction, and the X direction and the Y direction may be perpendicular to each other. For example, the X direction may be a vertical direction and the Y direction may be a horizontal direction.

For example, the image acquisition device 11 may be a network video camera, a digital video camera, a color dome video camera, an infrared video camera or an integrated video camera, etc., to photograph the image acquisition region 14 in real time, and then periodically acquire the detection image from the video image photographed by the image acquisition device 11. For another example, the image acquisition device 11 may also include a camera, to periodically photograph the image acquisition region 14, so as to acquire the detection image. The detection image may be stored, for example, in the image acquisition device 11, to be used by other components (for example, the terminal controller 15, etc.) in the trash sorting device 10 according to needs.

For example, in one example, the trash sorting device 10 may further include a timer or a timing program, to periodically trigger the image acquisition device to acquire the detection image of the trash to be sorted. The working mode of the timer or the timing program may refer to the related parts in the embodiment of the trash sorting and recycling method, and repeated parts will not be described again.

For example, the timer may be a pulse timer, an on-delay timer, an off-delay timer, and the like. For another example, the terminal controller 15 may have the timing program stored therein, and when a timing operation is required, the terminal controller 15 may directly run the timing program, to implement a timing function.

For another example, in one example, the trash sorting device 10 may further include a sensor. The sensor is configured to sense whether or not the image acquisition region 14 has trash to be sorted, if yes, the image acquisition device 11 acquires the detection image of the trash to be sorted, and then performs a subsequent operation on the detection image; if no, the image acquisition device 11 does not perform any operation, to save power.

For example, the terminal controller 15 is configured to transmit the detection image to a server end (or a cloud end), and is further configured to receive a control signal from the server end (or the cloud end) and control the sorting structure 13 according to the control signal. As shown in FIG. 3B, the terminal controller 15 may be provided at the lateral side of the image acquisition region 14. For example, the detection image may be transmitted to the server end (or the cloud end), the server end (or the cloud end) processes the detection image, and generates the control signal according to a processing result; the control signal, for example, may be transmitted to the terminal controller 15, and the terminal controller 15 may control the sorting structure 13 to deliver the trash to be sorted into the designated region according to the control signal.

For example, the terminal controller 15 is further configured to acquire an identification number of the trash sorting device 10, and transmit the identification number to the server end (or the cloud end). The description of the identification number may refer to the related description in the embodiment of the trash sorting and recycling method, which will not be repeated here.

For example, as shown in FIG. 3A, the terminal controller 15 may include components such as a terminal processor, a communication device, a power module, and the like.

For example, the terminal processor may be a micro control unit (MCU), and the like. The power module may provide a stable power source for various components in the terminal controller 15, and may also provide a stable power source for the image acquisition device 11. The power module may be an external direct current or alternating current power source, or may be a battery, for example, a primary battery or a secondary battery. For example, the communication device may include a wired network interface, and the like, that is, it transmits information in a wired transmission mode such as a twisted pair cable, a coaxial cable, or an optical fiber; the communication device may also include a Bluetooth module, a wireless network card (i.e., a WiFi module), and the like, that is, it transmits information in a wireless transmission mode such as 3G/4G/5G mobile communication network, Bluetooth, Zigbee or WiFi.

For example, the box body 12 may include a recycling region 120 and a non-recycling region 121. The recycling region 120 is used for storing recyclable trash, and the non-recycling region 121 is for storing non-recyclable trash. The sorting structure 13 is configured to deliver the trash to be sorted into the recycling region 120 or the non-recycling region 121 under control of the control signal.

For example, as shown in FIG. 3A and FIG. 3B, the sorting structure 13 includes a motor 130 and a baffle 131. The terminal processor may control a rotation direction of the motor 130 according to the control signal, and the motor 130 may drive the baffle 131 to rotate in at least two directions, so as to deliver the trash to be sorted into a designated region (for example, the recycling region 120, the non-recycling region 121), to complete sorting of the trash to be sorted.

For example, the recycling region 120, the non-recycling region 121 and the image acquisition region 14 have a certain accommodation space. For example, the recycling region 120, the non-recycling region 121 and the image acquisition region 14 may be a polyhedron, a cylinder, a sphere, and the like. Shapes of the recycling region 120 and the non-recycling region 121 may be the same or different.

Figure 4:
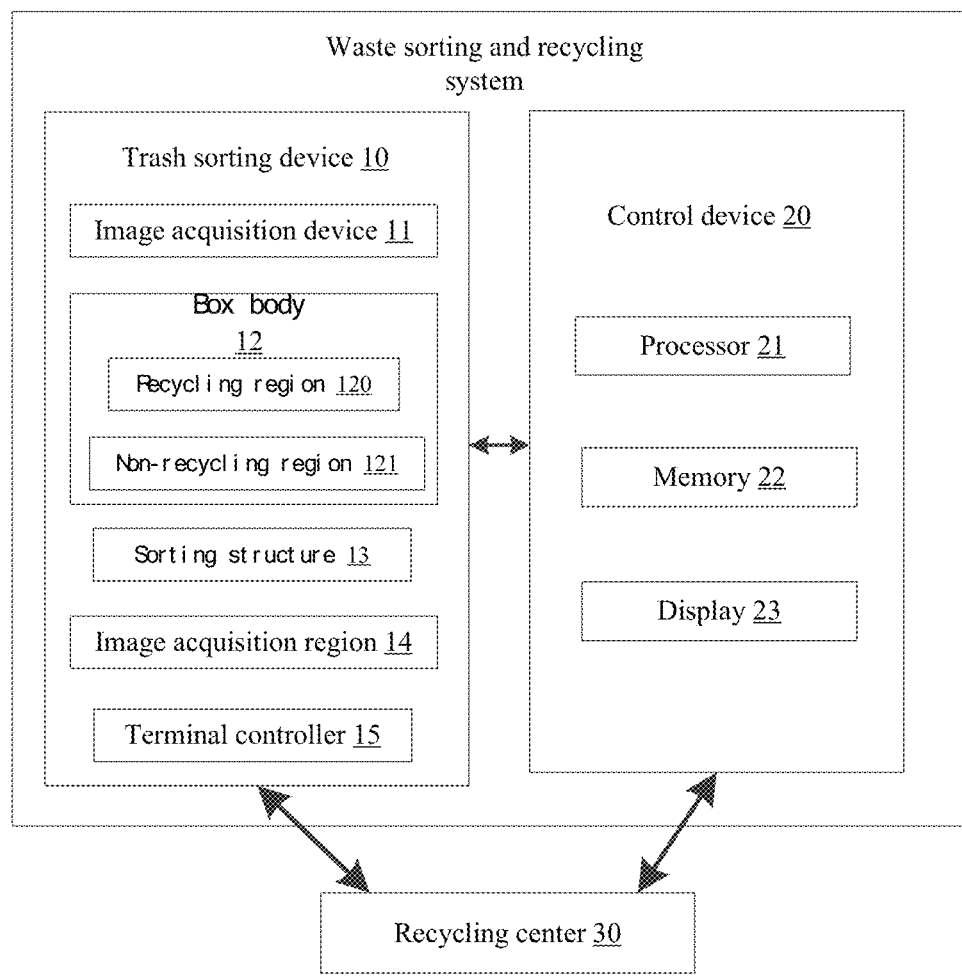
FIG. 4 is a schematic block diagram of a trash sorting and recycling system provided by an embodiment of the present disclosure.

An embodiment of the present disclosure further provides a trash sorting and recycling system. FIG. 4 shows a schematic block diagram of the trash sorting and recycling system provided by the embodiment of the present disclosure; and FIG. 5 shows a schematic diagram of the trash sorting and recycling system provided by the embodiment of the present disclosure.

Figure 5:
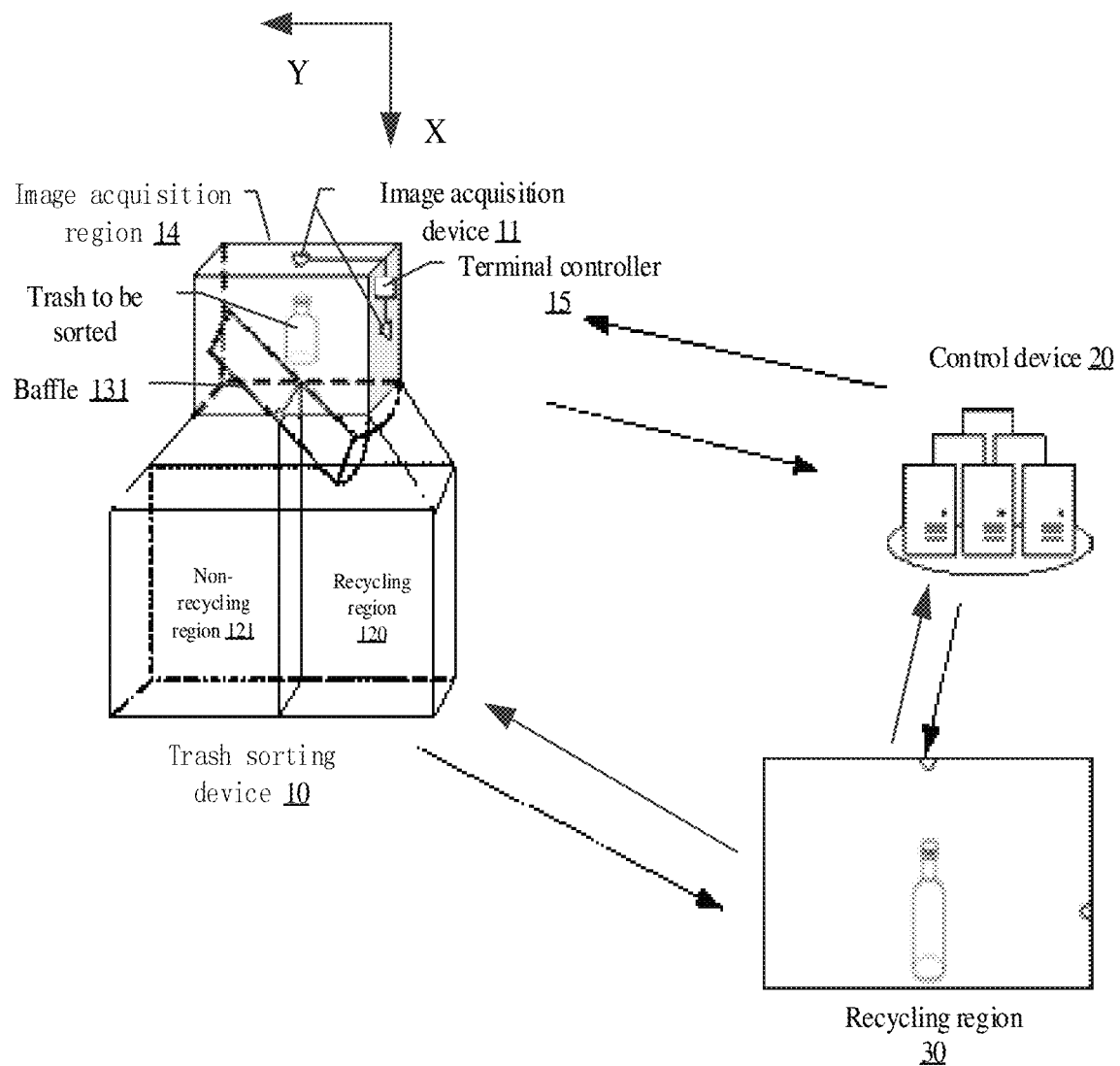
FIG. 5 is a schematic diagram of the trash sorting and recycling system provided by the embodiment of the present disclosure.

For example, as shown in FIG. 4 and FIG. 5, the trash sorting and recycling system comprises a control device 20 and the trash sorting device 10 according to any one of the above-described embodiments. In this embodiment, the control device 20 is provided at a server end (or a cloud end), that is to say, the control device 20 is a remote control device for the trash sorting device 10. However, it is not limited thereto, and the control device 20 may also be provided at the trash sorting device 10.

For example, as shown in FIG. 4 and FIG. 5, the trash sorting device 10 may include the image acquisition device 11, a box body 12, a sorting structure 13, an image acquisition region 14 and a terminal controller 15. The box body 12 may include a recycling region 120 and a non-recycling region 121. The control device 20 may include at least one processor 21 and at least one memory 22. Components, such as the image acquisition device 11, the terminal controller 15, a processor 21, and a memory 22, are interconnected by a bus system and/or other form of connection mechanism (not shown). It should be noted that, components and structures of the trash sorting and recycling system shown in FIG. 4 are merely exemplary and not limitative, and the trash sorting and recycling system may have other components and structures according to needs.

For example, the trash sorting device 10 and the control device 20 may communicate with each other via a wired network signal or a wireless network signal, that is, transmit information through a wired network or a wireless network.

For example, the processor 21 may be a central processing unit (CPU) or other form of processing unit having a data processing capability and/or a program execution capability, for example a graphics processing unit (GPU), a field programmable gate array (FPGA), or a tensor processing unit (TPU), and the like; and the processor 21 may control other components in the server end to execute a desired function. For another example, the central processing unit (CPU) may be an X86 or ARM architecture, and the like.

For example, the memory 22 may include one or any combination of a plurality of computer program products, and the computer program product may include various forms of computer readable storage media, for example, a volatile memory and/or a nonvolatile memory. The volatile memory may include, for example, a random access memory (RAM) and/or a cache memory, and the like. The nonvolatile memory may include, for example, a read only memory (ROM), a hard disk, an erasable programmable read only memory (EPROM), a portable compact disk read only memory (CD-ROM), a USB memory, a flash memory, and the like. One or more computer programs may be stored on the computer readable storage medium, and the processor 21 may run the computer program to implement various functions. Various applications and various data may also be stored in the computer readable storage medium, for example, a training parameter and a sample image library of a deep learning neural network, as well as various data used and/or generated by the application.

For example, the control device 20 may further include a display 23. The display 23 is used for displaying the first detection image and/or the second detection image, and the like. The display 23 may be, for example, a liquid crystal display, an organic light-emitting diode display, and the like.

It should be noted that, description of respective components in the trash sorting device 10 may refer to related parts of the embodiment of the trash sorting device, which will not be repeated here.

For example, the computer program may be run by the processor 21 to executed steps of: acquiring a detection image; processing the detection image with the deep learning neural network to judge whether or not trash to be sorted belongs to recyclable trash, and if yes, sending a first control signal to the trash sorting device 10, to control to deliver the trash to be sorted into the recycling region 120; if no, sending a second control signal to the trash sorting device 10, to control to deliver the trash to be sorted into the non-recycling region 121.

For example, in one example, the detection image includes a plurality of images photographed from different angles. The computer program may be further run by the processor 21 to execute steps of: processing the detection image with the deep learning neural network and combining processing results of the images photographed from different angles to judge whether or not the trash to be sorted belongs to the recyclable trash, and if yes, sending the first control signal; if no, sending the second control signal.

For example, in one example, the computer program may be further run by the processor 21 to execute steps of: acquiring an identification number of the trash sorting device 10 corresponding to the acquired detection image; and selecting a training parameter of the deep learning neural network corresponding to the identification number according to the identification number.

For example, in one example, the computer program may be further run by the processor 21 to execute steps of: counting a recycling quantity, in a case where it is judged that the trash to be sorted belongs to the recyclable trash; and sending a recycling control signal, if the recycling quantity exceeds a predetermined bearing quantity of the recycling region 120, to prompt a recycling center 30 to recycle the trash in the recycling region 120.

For example, in one example, the trash sorting device 10 or the control device 20 may be provided with a counter or a counting program. A working mode of the timer or the timing program (operations of counting and zeroing, etc.) may refer to description of related parts in the embodiment of the trash sorting and recycling method, and repeated parts will not be described here again.

For example, the counter may be an up counter, an up-down counter, and the like.

For example, after a worker at the recycling center 30 recycles the trash in the recycling region 120, he/she may further send an end recycling signal through the control device 20, to control the counter or the counting program to perform the zeroing operation.

For example, each trash sorting device 10 may recycle one type of recyclable trash, or may also recycle a plurality of different types of recyclable trash.

For example, in one example, the recyclable trash includes at least one type of recyclable trash, correspondingly, a recycling region 120 of each trash sorting device 10 includes at least one sub-recycling region, and the first control signal includes at least one sub-control signal. In this case, the computer program may be further run by the processor 21 to execute steps of: judging whether or not the trash to be sorted belongs to one of the at least one type of recyclable trash, and if yes, sending a corresponding sub-control signal, to control to deliver the trash to be sorted into a corresponding sub-recycling region; if no, sending a second control signal, to control to deliver the trash to be sorted into a non-recycling region.

For example, in one example, the computer program may be further run by the processor 21 to execute steps of: calculating a matching ratio between the trash to be sorted and the recyclable trash; judging whether or not the matching ratio exceeds a first preset matching ratio threshold, and if yes, judging that the trash to be sorted belongs to the recyclable trash; if no, judging that the trash to be sorted does not belong to the recyclable trash.

For example, in a case where it is judged that the trash to be sorted belongs to the recyclable trash, the computer program may be further run by the processor 21 to execute steps of: storing the detection image.

For example, in one example, the computer program may be further run by the processor 21 to execute steps of: judging whether or not the matching ratio exceeds a second preset matching ratio threshold, in a case where the matching ratio is lower than the first preset matching ratio threshold, and if yes, storing the detection image; if no, deleting the detection image.

For example, the second preset matching ratio threshold is smaller than the first preset matching ratio threshold.

For example, in one example, the computer program may be further run by the processor 21 to execute steps of: re-judging whether or not the trash to be sorted shown in the stored detection image belongs to the recyclable trash, and if yes, adding the stored detection image to the sample image library of the deep learning neural network; if no, deleting the stored detection image.

For example, a statistical method (i.e., a decision theory approach), a syntax recognition method, a neural network method, a template matching method, or a geometric transformation method may be used for re-judging whether or not the trash to be sorted shown in the stored detection image belongs to the recyclable trash. Alternatively, whether or not the trash to be sorted shown in the stored detection image belongs to the recyclable trash may be manually checked by a backstage user periodically. For example, the stored detection image may be displayed on the display 23 for the backstage user to view.

For example, in one example, the computer program may be further run by the processor 21 to execute steps of: re-training the deep learning neural network with the training image in the sample image library, after adding the detection image to the sample image library; and modifying the training parameter of the deep learning neural network according to the training result.

It should be noted that, the description of the identification number, the predetermined bearing quantity, the deep learning neural network and its training parameter, the matching ratio, the first preset matching ratio threshold, the second preset matching ratio threshold, the sample image library, the sub-recycling region, the sub-control signal, the type of the recyclable trash, and the like may refer to related description in the embodiment of the trash sorting and recycling method, and repeated parts will not be described here again.

An embodiment of the present disclosure further provides a storage medium, and the storage medium has a computer program suitable for running by a processor stored therein.

For example, in one example of this embodiment, the storage medium may be applied to the trash sorting and recycling system according to any one of the above-described embodiments, for example, it may be a memory in a control device of the trash sorting and recycling system.

For example, the computer program may be run by the processor to execute steps of: acquiring a detection image; processing the detection image with a deep learning neural network to judge whether or not trash to be sorted belongs to recyclable trash, and if yes, sending a first control signal, to control to deliver the trash to be sorted into a recycling region; if no, sending a second control signal, to control to deliver the trash to be sorted into a non-recycling region.

For example, the description of the storage medium may refer to the description of the memory in the embodiment of the trash sorting and recycling system, and repeated parts will not be described again.

With respect to the present disclosure, several points below need to be explained:

(1) The drawings of the embodiments of the present disclosure relate only to the structures involved in the embodiments of the present disclosure, and normal designs may be referred to for other structures.

(2) In case of no conflict, the embodiments of the present disclosure and the features in the embodiments may be combined with each other to obtain a new embodiment.

The above are only specific embodiments of the present disclosure, but the scope of the embodiment of the present disclosure is not limited thereto, and the scope of the present disclosure should be the scope of the following claims.

The invention claimed is:

1. A trash sorting and recycling method, comprising:
   acquiring a detection image of trash to be sorted;
   processing the detection image with a deep learning neural network to judge whether or not the trash to be sorted belongs to recyclable trash; if yes, sending a first control signal, to control to deliver the trash to be sorted into a recycling region; if no, sending a second control signal, to control to deliver the trash to be sorted into a non-recycling region,
   wherein the judging whether or not the trash to be sorted belongs to the recyclable trash includes:
   calculating a matching ratio between the trash to be sorted and the recyclable trash;
   judging whether or not the matching ratio exceeds a first preset matching ratio threshold, and if yes, judging that the trash to be sorted belongs to the recyclable trash; if no, judging that the trash to be sorted does not belong to the recyclable trash.

2. The trash sorting and recycling method according to claim 1, wherein, the detection image includes a plurality of images photographed from different angles,
   the trash sorting and recycling method further comprises:
   processing the detection image with the deep learning neural network and combining processing results of the images photographed from different angles to judge whether or not the trash to be sorted belongs to the recyclable trash; if yes, sending the first control signal, to control to deliver the trash to be sorted into the recycling region; if no, sending the second control signal, to control to deliver the trash to be sorted into the non-recycling region.

3. The trash sorting and recycling method according to claim 1, further comprising:
   acquiring an identification number of a trash sorting device corresponding to the acquired detection image;
   selecting a training parameter of the deep learning neural network corresponding to the identification number.

4. The trash sorting and recycling method according to claim 1, further comprising:
   counting a recycling quantity, in a case where it is judged that the trash to be sorted belongs to the recyclable trash;
   sending a recycling control signal, in a case where the recycling quantity exceeds a predetermined bearing quantity of the recycling region, to prompt the recycling center to recycle the trash in the recycling region.

5. The trash sorting and recycling method according to claim 1, wherein, the recyclable trash includes at least one type of recyclable trash, the recycling region includes at least one sub-recycling region, and the first control signal includes at least one sub-control signal,
   the trash sorting and recycling method further comprises:
   judging whether or not the trash to be sorted belongs to one of the at least one type of recyclable trash, and if yes, sending a corresponding sub-control signal, to control to deliver the trash to be sorted into a corresponding sub-recycling region; if no, sending a second control signal, to control to deliver the trash to be sorted into a non-recycling region.

6. The trash sorting and recycling method according to claim 1, further comprising:
   in a case where the matching ratio is lower than the first preset matching ratio threshold, judging whether or not the matching ratio exceeds a second preset matching ratio threshold, and if yes, storing the detection image; if no, deleting the detection image, wherein, the second preset matching ratio threshold is smaller than the first preset matching ratio threshold.

7. The trash sorting and recycling method according to claim 6, further comprising:
   re-judging whether or not the trash to be sorted shown in the stored detection image belongs to the recyclable trash; if yes, adding the stored detection image to a sample image library of the deep learning neural network; if no, deleting the stored detection image.

8. The trash sorting and recycling method according to claim 7, further comprising:
   re-training the deep learning neural network with a training image in the sample image library, after adding the stored detection image to the sample image library, and modifying a training parameter of the deep learning neural network according to a training result.

9. The trash sorting and recycling method according to claim 1, wherein, the deep learning neural network is a convolutional neural network.

10. A trash sorting and recycling system, comprising: a control device and a trash sorting device,
   the trash sorting device, comprises: a sorting structure, an image acquisition device and a terminal controller, wherein,
   the image acquisition device is configured to acquire a detection image of trash to be sorted;
   the terminal controller is configured to transmit the detection image, and is further configured to receive a control signal and control the sorting structure according to the control signal
   wherein, the control device includes:
   a processor and a memory, the memory has a computer program suitable for running by the processor stored therein, and the computer program is run by the processor to execute steps of:
   acquiring a detection image;
   processing the detection image with a deep learning neural network to judge whether or not trash to be sorted belongs to recyclable trash; if yes, sending a first control signal to the trash sorting device, to control to deliver the trash to be sorted into a recycling region; if no, sending a second control signal to the trash sorting device, to control to deliver the trash to be sorted into a non-recycling region,
   wherein, when the computer program is run by the processor, the system further executes steps of:
   calculating a matching ratio between the trash to be sorted and the recyclable trash;
   judging whether or not the matching ratio exceeds a first preset matching ratio threshold, and if yes, judging that the trash to be sorted belongs to the recyclable trash; if no, judging that the trash to be sorted does not belong to the recyclable trash.

11. The trash sorting and recycling system according to claim 10, wherein, the detection image includes a plurality of images photographed from different angles,
   when the computer program is run by the processor, the system further executes steps of:
   processing the detection image with the deep learning neural network and combining process results of the images photographed from different angles, to judge whether or not the trash to be sorted belongs to the recyclable trash, if yes, sending the first control signal; if no, sending the second control signal.

12. The trash sorting and recycling system according to claim 10, wherein, when the computer program is run by the processor, the system further executes steps of:
   acquiring an identification number of the trash sorting device corresponding to the acquired detection image;
   selecting a training parameter of the deep learning neural network corresponding to the identification number.

13. The trash sorting and recycling system according to claim 10, wherein, when the computer program is run by the processor, the system further executes steps of:
   counting a recycling quantity, in a case where it is judged that the trash to be sorted belongs to the recyclable trash;
   sending a recycling control signal, in a case where the recycling quantity exceeds a predetermined bearing quantity of the recycling region, to prompt the recycling center to recycle the trash in the recycling region.

14. The trash sorting and recycling system according to claim 10, wherein when the computer program is run by the processor, the system further executes steps of:
   judging whether or not the matching ratio exceeds a second preset matching ratio threshold, in a case where the matching ratio is lower than the first preset matching ratio threshold; if yes, storing the detection image; if no, deleting the detection image, wherein, the second preset matching ratio threshold is smaller than the first preset matching ratio threshold.

15. The trash sorting and recycling system according to claim 14, wherein, when the computer program is run by the processor, the system further executes steps of:
   re-judging whether or not the trash to be sorted shown in the stored detection image belongs to the recyclable trash; if yes, adding the stored detection image to a sample image library of the deep learning neural network; if no, deleting the stored detection image.

16. The trash sorting and recycling system according to claim 15, wherein, when the computer program is run by the processor, the system further executes steps of:
   re-training the deep learning neural network with a training image in the sample image library, after adding the stored detection image to the sample image library, and modifying a training parameter of the deep learning neural network according to a training result.

* * * * *